US011777727B1

(12) United States Patent
Anderson et al.

(10) Patent No.: US 11,777,727 B1
(45) Date of Patent: Oct. 3, 2023

(54) DISTRIBUTED DIGITAL WALLET SEED PHRASE

(71) Applicant: OSOM Products, Inc., Palo Alto, CA (US)

(72) Inventors: Gary Anderson, San Mateo, CA (US); Jason Sean Gagne-Keats, Cupertino, CA (US); David John Evans, V, Portola Valley, CA (US)

(73) Assignee: OSOM PRODUCTS, INC., Cupertino, CA (US)

( * ) Notice: Subject to any disclaimer, the term of this patent is extended or adjusted under 35 U.S.C. 154(b) by 0 days.

(21) Appl. No.: 17/823,051

(22) Filed: Aug. 29, 2022

(51) Int. Cl.
*H04L 9/08* (2006.01)
(52) U.S. Cl.
CPC ............ *H04L 9/0894* (2013.01); *H04L 9/085* (2013.01); *H04L 9/0861* (2013.01)
(58) Field of Classification Search
CPC ...... H04L 9/0894; H04L 9/085; H04L 9/0861
See application file for complete search history.

(56) References Cited

U.S. PATENT DOCUMENTS

| | | | | |
|---|---|---|---|---|
| 11,101,986 | B2* | 8/2021 | Carmignani | ........ H04L 63/0861 |
| 11,374,750 | B2* | 6/2022 | Dolan | .................... H04L 9/3252 |
| 2018/0191501 | A1* | 7/2018 | Lindemann | ........... H04L 9/0833 |
| 2019/0245688 | A1* | 8/2019 | Patin | ....................... H04L 9/321 |
| 2019/0280864 | A1* | 9/2019 | Cheng | .................. H04L 9/3239 |
| 2020/0092097 | A1* | 3/2020 | Chiu | .................. G06Q 20/3678 |
| 2020/0259638 | A1* | 8/2020 | Carmignani | .............. H04L 9/50 |
| 2020/0389306 | A1* | 12/2020 | Dolan | ................... H04L 9/3066 |
| 2021/0266150 | A1* | 8/2021 | Ornelas | ................... G06F 3/067 |
| 2021/0409213 | A1* | 12/2021 | Lu | .......................... H04L 9/0897 |

OTHER PUBLICATIONS

United States Patent & Trademark Office (USPTO), International Search Report and Written Opinion, PCT/US2022/076884, dated Feb. 8, 2023, counterpart to U.S. Appl. No. 17/823,051.

* cited by examiner

*Primary Examiner* — J. Brant Murphy
(74) *Attorney, Agent, or Firm* — Perkins Coie LLP; Alberto Araiza

(57) ABSTRACT

The disclosed technique secures a seed phrase configured to access a digital wallet, which holds private keys to access digital assets on a blockchain. Copies of portions of the seed phrase are stored at multiple electronic devices. The seed phrase can be reconstructed at a particular device by retrieving a necessary and sufficient number of the portions from the other devices. In one example, the portions can be shared among devices when in physical proximity to each other and/or when the devices are authenticated as belonging to the same user, which owns the digital wallet. As such, the seed phrase can be stored securely across multiple devices and retrieved even when one of those devices is lost, damaged, or stolen.

19 Claims, 7 Drawing Sheets

An example of a seed phrase is:

watch build practice feed smile open dismal creek road once heat most

DISTRIBUTED DIGITAL WALLET SEED PHRASE

BACKGROUND

A seed phrase, seed recovery phrase, or backup seed phrase corresponds to a list of terms (e.g., words) that store all the information needed to recover a digital asset (e.g., cryptocurrency). A digital wallet (e.g., crypto wallet) is software that will typically generate a seed phrase and instruct the user to write it down on paper. The correct seed phrase grants the user access to private keys stored in the digital wallet, which are required to access digital assets on the blockchain. If the user's computer breaks or their hard drive becomes corrupted, the user can download the same wallet software again and use the paper backup of the seed phrase to recover access to the user's digital wallet, and thus access to the user's digital assets.

Seed phrases are thus an excellent way of backing up and storing access to digital assets. As such, seed phrases are used by almost all well-regarded digital wallet software. However, anybody who discovers the seed phrase can steal the digital assets by gaining access to the user's digital wallet. Accordingly, a seed phase must be kept safe and secure like any other password or valuable asset. For example, the seed phrase should not be typed into any website that can be accessible by others.

BRIEF DESCRIPTION OF THE DRAWINGS

Detailed descriptions of implementations of the present technology will be described and explained through the use of the accompanying drawings.

Figure 1:
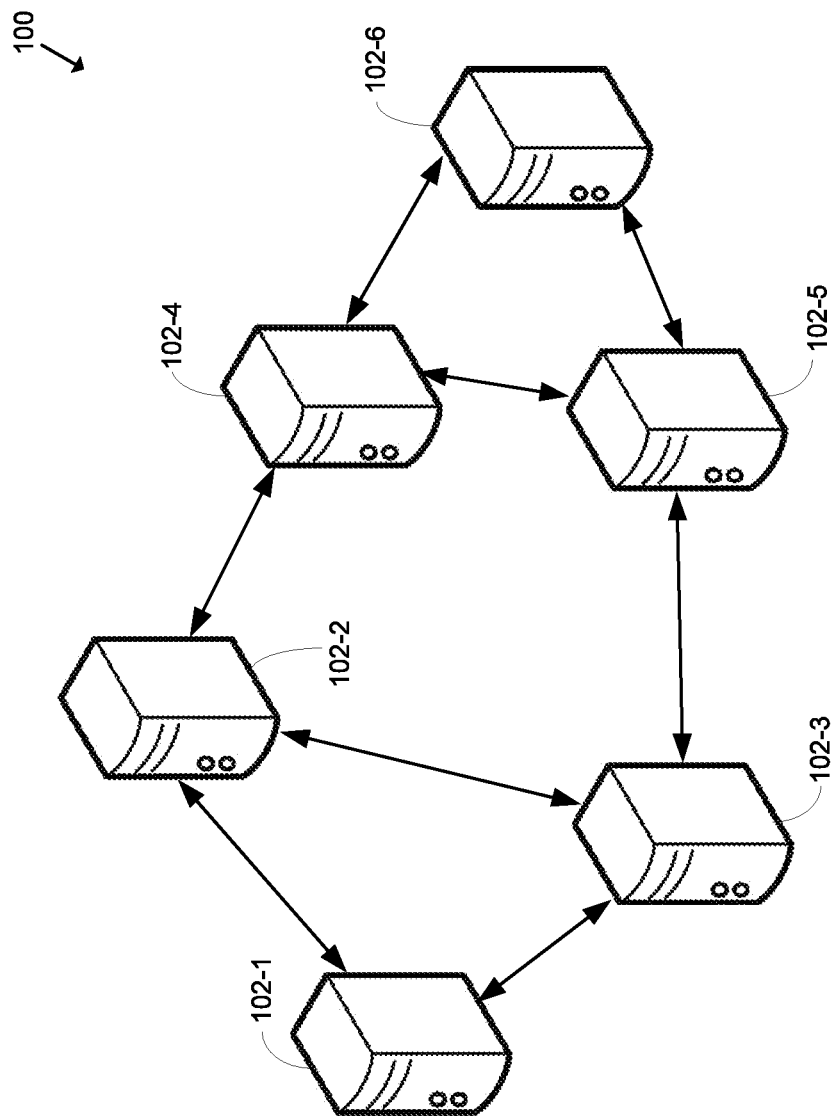
FIG. 1 is a block diagram that illustrates a system configured to store and retrieve data maintained on a blockchain network.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology secures seed phrases of digital wallets by copying different portions of a seed phrase over a number (N) of electronic devices ("devices"). The complete seed phrase can be reconstructed by a user that has access to fewer than the N devices, corresponding to a minimum (M) number of devices that are required to reconstruct the complete seed phrase. As such, if a device is lost or stolen, the seed phrase can be reconstructed with the remaining M devices. In one example, using the seed phrase to transact with digital assets (e.g., cryptocurrency) requires access to at least the M devices to assemble the seed phrase temporarily. In one example, the complete seed phrase can be assembled based on M portions that are retrieved from M devices by communicating the M portions to a requesting device (e.g., a smartphone), which is owned by the user that also owns the corresponding digital wallet. The portions of the seed phrase can be communicated to the requesting device over short-range radio links when the M devices are in physical proximity of each other.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Blockchain

In layman's terms, a digital distributed ledger (e.g., blockchain) stores digital records of things such as transactions that are distributed and maintained among nodes of a computer network, where the entries are stored in blocks of the ledger that are cryptographically related. A public blockchain is a common example of a distributed ledger that can record transactions between parties in a verifiable and permanent way. Specifically, a blockchain system has a decentralized, distributed database where a ledger is maintained by peer nodes. Hence, an intermediary is not required to maintain a blockchain. The transactions are typically authenticated with cryptographic hashing and mining techniques.

A blockchain is analogous to a distributed database on a distributed computing system that maintains a continuously growing list of ordered records called blocks. A block of a blockchain includes records of transactions or other recorded data. Each block contains at least one timestamp, and a block links to a previous block to thus form a chain of blocks. Blockchains are inherently resistant to modification of their recorded data. That is, once recorded, the data in a block cannot be altered retroactively. Through a peer network and distributed timestamping, a blockchain is managed in an autonomous manner.

Decentralized consensus can be achieved with a blockchain. This makes blockchains suitable for recording events other records management activities, identity management, transaction processing, and proving data provenance. Well-known examples of decentralized systems that implement blockchains include Bitcoin and Ethereum cryptocurrencies. These types of systems provide a pragmatic solution for arriving at a consensus in the face of trust and timing problems typically encountered in distributed networks.

FIG. 1 illustrates a network 100 of interconnected peer nodes 102-1 through 102-6 (also referred to collectively as "peer nodes 102" and individually as "peer node 102"). The peer nodes 102 can be distributed across various geographic locations including regions all over the world. The network 100 can include a combination of private, public, wired, or wireless portions. Data communicated over the network 100 can be encrypted or unencrypted at various locations or portions of the network 100. Each peer node 102 can include combinations of hardware and/or software to process data, perform functions, communicate over the network 100, and the like.

The peer nodes 102 can include computing devices such as servers, desktop or laptop computers, and any other electronic device. Any component of the network 100 can include a processor, memory or storage, a network transceiver, a display, an operating system and application software (e.g., for providing a user interface), and the like. Other components, hardware, and/or software included in the network 100 that are well known to persons skilled in the art are not shown or discussed herein for the sake of brevity.

The network 100 can implement a blockchain that allows for the secure management of a shared ledger, where transactions are verified and stored on the network 100 without a governing central authority. Blockchains can be implemented in different configurations, ranging from public open-source networks to private blockchains that require explicit permission to read or write transactions. Central to a blockchain are cryptographic hash functions that secure the network 100, in addition to enabling transactions, to protect a blockchain's integrity and anonymity.

The network 100 can utilize cryptography to securely process data. For example, public-key cryptography uses asymmetric key algorithms, where a key used by one party to perform either encryption or decryption is not the same as the key used by another in the counterpart operation. Each party has a pair of cryptographic keys: a public encryption key and a private decryption key. For example, a key pair used for digital signatures can consist of a private signing key and a public verification key. The public key can be widely distributed, while the private key is known only to its proprietor. The keys are related mathematically, but the parameters are chosen so that calculating the private key from the public key is unfeasible. Moreover, the keys could be expressed in various formats, including hexadecimal format.

Crypto Wallet

A digital wallet (also referred to herein as a "crypto wallet") stores private keys, that are required to access digital assets. They also allow a user to send, receive, and spend digital assets such as cryptocurrencies ("crypto") like Bitcoin and Ethereum. Digital wallets store a user's private keys, which are the passwords that give the user access to the user's digital assets. The private keys are kept safe and accessible, allowing the user to send and receive digital assets like Bitcoin and Ethereum. They come in many forms, from hardware wallets like Ledger (e.g., appear like a USB stick) to mobile apps like Coinbase Wallet. Unlike a normal wallet that can hold physical cash, digital wallets technically do not store digital assets. Instead, the digital assets can live on a blockchain, but can only be accessed using a private key stored in a digital wallet. The keys thus prove ownership of digital assets and allow the user to perform transactions. If a user loses his or her private keys, the user loses access to the digital assets. That is why it is important to keep a hardware wallet safe or use a trusted wallet service provider.

Digital wallets range from simple-to-use apps to more complex security solutions. The main types of wallets include paper wallets, hardware wallets, and online wallets. For paper wallets, keys are written on a physical medium like paper and stored in a safe place. For hardware wallets, keys are stored in a USB device that is kept in a safe place and only connected to a computer when the user wants to access his or her digital assets. For online wallets, keys are stored in an app or other software, which can be protected by two-step encryption. This makes sending, receiving, and using crypto as easy as using any online bank account, payment system, or brokerage.

Each type of digital wallet has its tradeoffs. Paper and hardware wallets are harder for malicious users to access because they are stored offline, but they are limited in function and risk being lost or destroyed. Online wallets offered by a major exchange are the simplest way to get started in crypto and offer a balance of security and easy access. However, because the user's private information is online, protection against hackers is only as good as the wallet provider's security. Hence, features like two-factor verification are preferred. An online wallet can thus allow a user to manage all the user's digital assets in one secure place, control the user's own private keys, send and receive crypto to/from anywhere in the world, interact with usernames rather than long, hexadecimal public key addresses, and shop at stores that accept crypto.

Seed Phrases

Figures 2A, 2B:
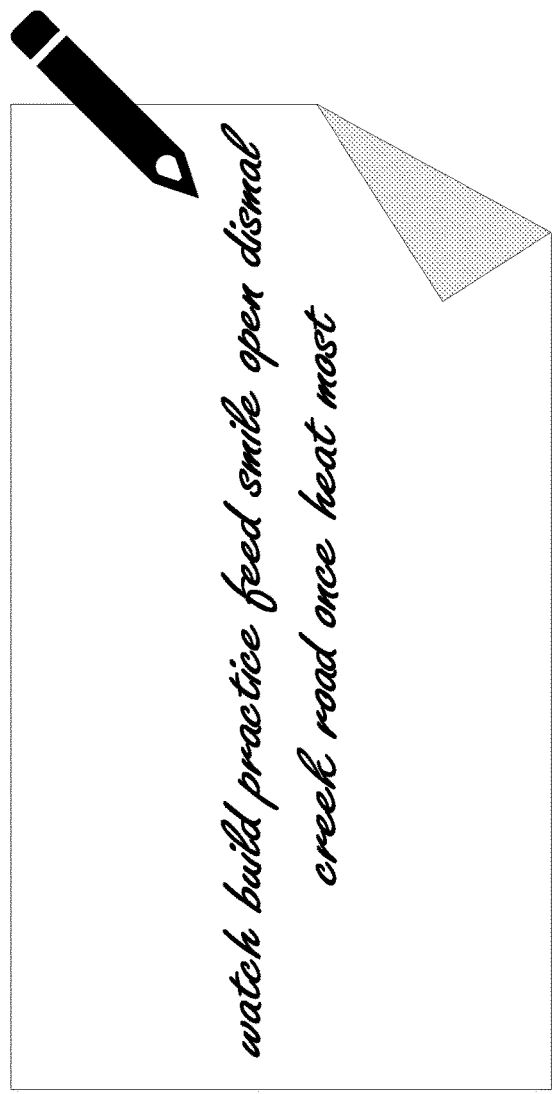
FIG. 2A shows an example of a seed phrase.
FIG. 2B shows an example of a common way in which a seed phrase is stored for backup.

A recovery phrase (e.g., a seed phrase) is a series of words generated by a digital wallet that gives the user access to the crypto associated with that wallet. Hence, the wallet is similar to a password manager for crypto, and the seed phrase is similar to a master password. FIG. 2A shows an example of a seed phrase. As shown, the seed phrase is: witch collapse practice feed shame open despair creek road again ice least. FIG. 2B shows an example of a common way in which a seed phrase is stored for backup. As shown, the seed phrase of FIG. 2A is written down on a piece of paper. This method of storing a seed phrase is risky given that the piece of paper can get misplaced, lost, damaged, or stolen.

BIP39 is a standard in crypto wallets. BIP39 defines how wallets create seed phrases and generate encryption keys. The numbers selected to create the BIP39 seed phrase should be random. A BIP39 seed phrase created with appropriate randomness cannot be guessed through brute force, because there are too many permutations. A BIP39 passphrase adds a moderate amount of additive protection in case a BIP39 seed phrase is stolen or otherwise accidentally exposed. BIP32 and BIP44 are related standards that have paved the way to other wallet features that make it more convenient for users to manage digital assets.

Distributed Seed Phrase

Figure 3A:
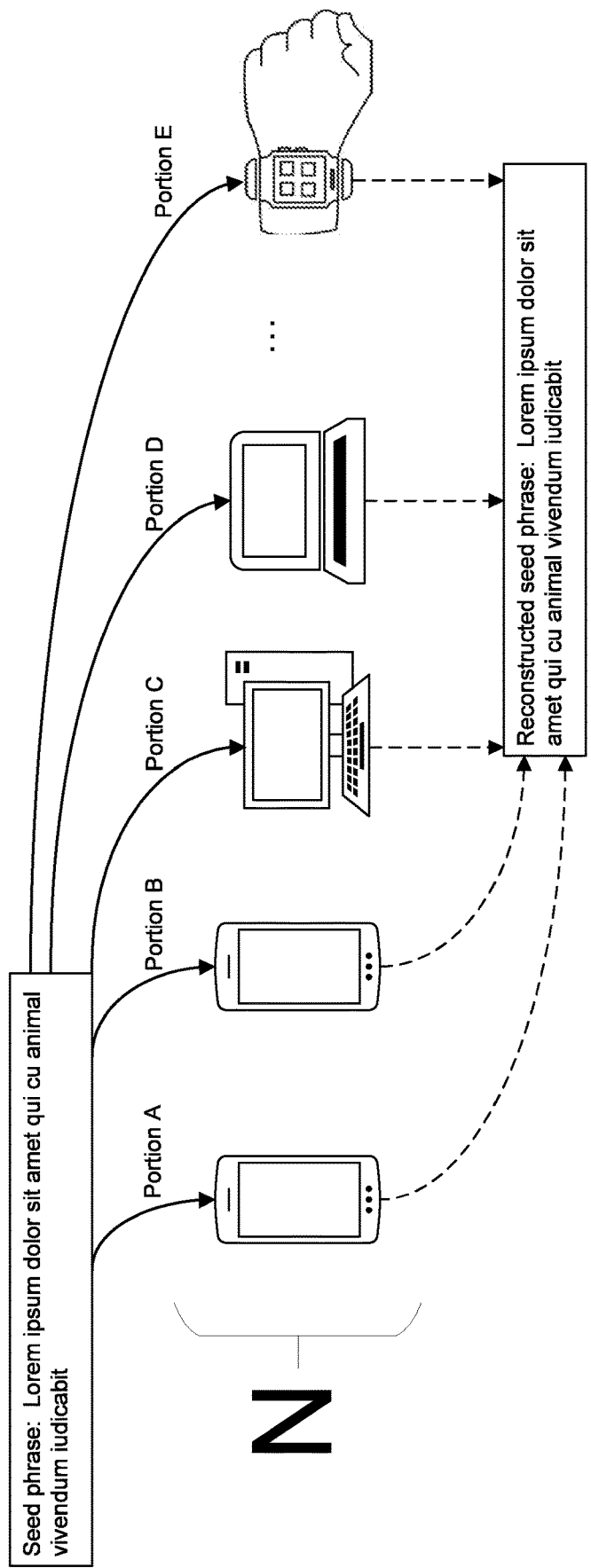
FIG. 3A illustrates recovery of a seed phrase that is segmented into portions and distributed across a number of electronic devices.

FIG. 3A illustrates recovery of a seed phrase that is segmented into portions and distributed across a number (N) of electronic devices. As shown, there are N electronic devices that store a portion or at least a portion of a given seed phrase, which includes an unordered or ordered combination of terms (e.g., words) or groups of characters. The entire seed phrase including a number (K) of terms is required to access a digital wallet. For example, each and every term, in the particular given combination is required to function as a key to access contents of a crypto wallet. In other words, if there is any missing term or the terms are out of order, the seed phrase will fail to operate as a key for the crypto wallet.

As shown, there are N devices that are each allocated respective portions of a seed phrase. The portions A, B, C, D, and E can include, for example, one term, two terms, three terms, or more. In another example, the portions can include portions of terms (e.g., combinations of one or more characters of one or more terms), which can be scrambled or processed through a hash algorithm. The portions can have an equal number of terms/characters or an unequal number of terms/characters. At least some but not all of those portions can be identical. A portion of the seed phrase can include the terms in the same order required by the seed phrase or in a different order that can be re-ordered before being reassembled for use as a seed phrase for a digital wallet. In one example, the entire seed phrase is not stored at any particular device. As such, access to the entire seed phrase requires access to at least two or more devices. The minimum number (M) of devices required to reconstruct the seed phrase can depend on the number and extent of the portions of the seed phrase. For example, a seed phrase having K terms can be divided across N devices, where N can range from 2 to K. To reconstruct the seed phrase, there would need to be sufficient overlap of the portions of the seed phrase across a set of devices such that a minimum number M of devices is required. For example, setting a security level to require three devices to reconstruct the key phrase requires that the portions distributed across any two devices are insufficient to reconstruct the entire seed phrase. As such, a minimum number M of the N devices is required to reconstruct the seed phrase.

Figure 3B:
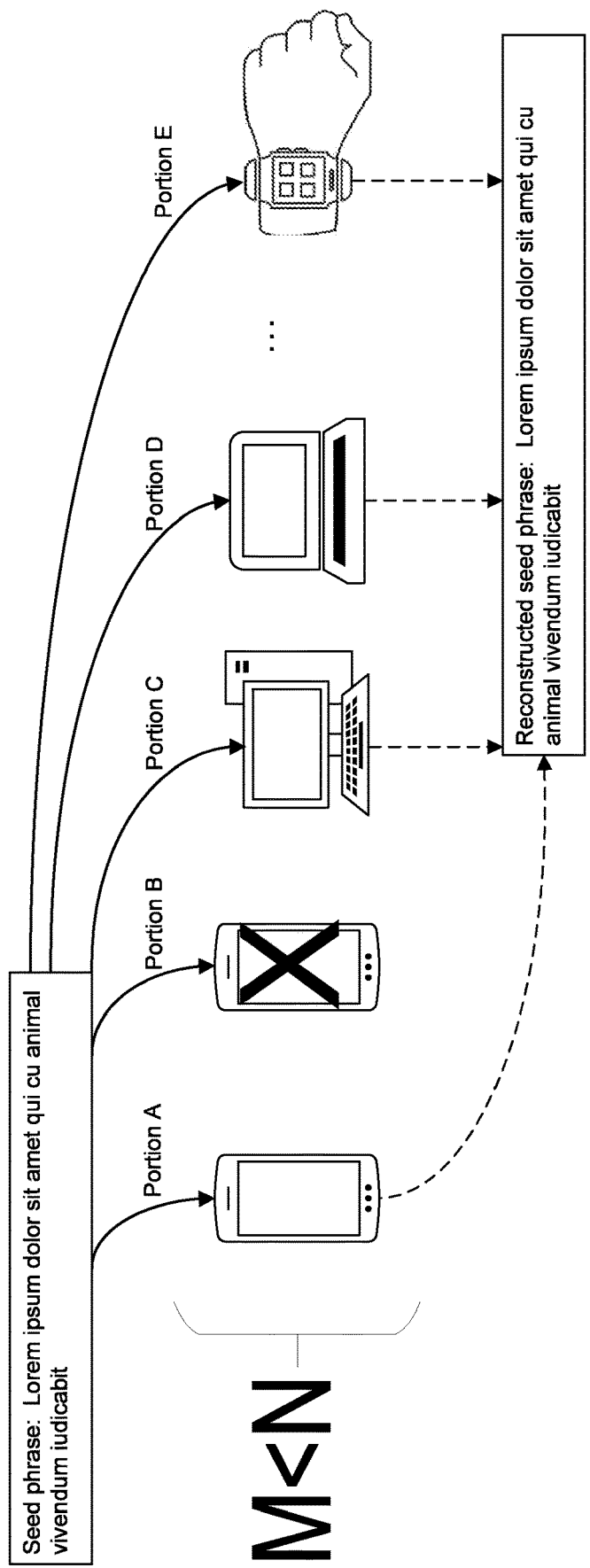
FIG. 3B illustrates recovery of a seed phrase that is segmented into portions and distributed across a number of electronic devices, where a device is unavailable to recover a portion of the seed phrase.

FIG. 3B illustrates recovery of a seed phrase that is segmented into portions and distributed across a number of electronic devices, where at least one device is unavailable to recover its portion of the seed phrase. In the illustrated example, the available devices is at least N−1 and the minimum number of devices required to reconstruct the seed phrase is M. That is, one less than N devices are available to reconstruct the seed phrase. In this example, the number of remaining devices that are available is sufficient for reconstructing the seed phrase. As a result, if a device is lost, damaged, or stolen, the seed phrase remains recoverable based on at least M remaining devices.

The strength of the security of the distributed seed phrase can depend on the number of devices required to reconstruct the full seed phrase (e.g., required M devices). For example, only requiring two devices (M=2) to reconstruct the full seed phrase would be the lowest security level. In this example, the seed phrase is allocated over at least three devices (N=3) so that losing access to any one of the three devices still allows for recovery of the seed phrase. A higher security level would require three devices (M=3) to reconstruct the full seed phrase. In that example, the seed phrase is allocated over at least four devices (N=4) such that losing access to any one of the four devices still allows a user to recover the seed phrase. The security level would keep increasing as more devices are required to recover the seed phrase. Hence, when number of terms in a portion (K) equals the number of devices required to reconstruct the seed phrase (M=K), the seed phrase should be distributed over at least K+1 (N=K+1) devices such that the loss of any of the devices allows a user to reconstruct the seed phrase.

Figure 4:
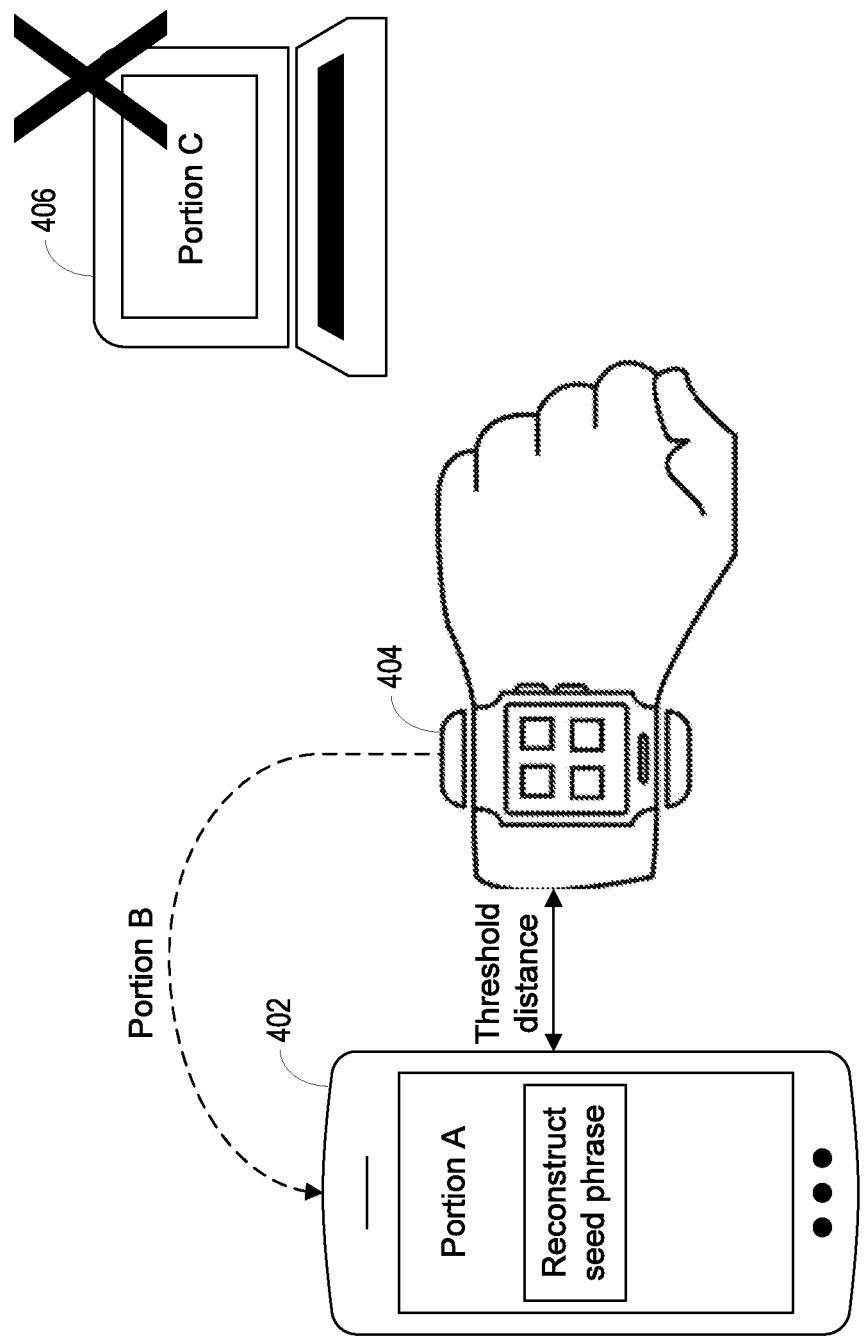
FIG. 4 depicts a mechanism for reconstructing a seed phrase from portions stored at multiple devices.

FIG. 4 depicts a mechanism for reconstructing a seed phrase from portions stored at multiple devices. In one example, the seed phrase has an ordered set of terms (e.g., 16 terms). Portions of the seed phrase are distributed across three devices: Portion A includes the first 8 terms, Portion B includes the last 8 terms, and Portion C includes the first 4 terms and the last 4 terms. As such, the entire seed phrase can be reconstructed based on any combination of two portions A, B, or C. As shown, device 402 is a mobile phone that stores Portion A, device 404 is a smart watch that stores Portion B, and device 406 is a laptop that stores Portion C.

In the illustrated example, the mechanism requires that the devices be within a threshold distance of each other to communicate their portions to either device. In particular, any two of devices 402, 404, and 406 must be within the threshold distance to transfer their portion of the seed phrase to each other. The distance can depend on the communications technology used to directly communicatively-couple the devices (e.g., without using an intermediary access point or base station). Examples of the communications technology include Bluetooth, Z-Wave, ZigBee, or Near-Field Communication (NFC). For example, NFC which is a short-range wireless connectivity technology that uses magnetic field induction to enable communication between devices when they are touched together or brought within a few centimeters of each other.

The mechanism can require different or additional forms of authentication to allow one device to communicate its portion of the seed phrase to another device that stores another portion of the seed phrase. For example, authentication may require that a user input one or more passwords into interfaces of the devices. The authentication can also occur in the background without needing user input. For example, the devices can include applications that store information indicating owners of the devices. As such, the applications can verify a common owner to enable communicating their respective portions among each other. Another example of an authentication factor can include one device displaying a QR code that is captured by a camera of another device to verify that the two devices are authenticated as a pair that can share the seed phrase portions.

Figure 5:
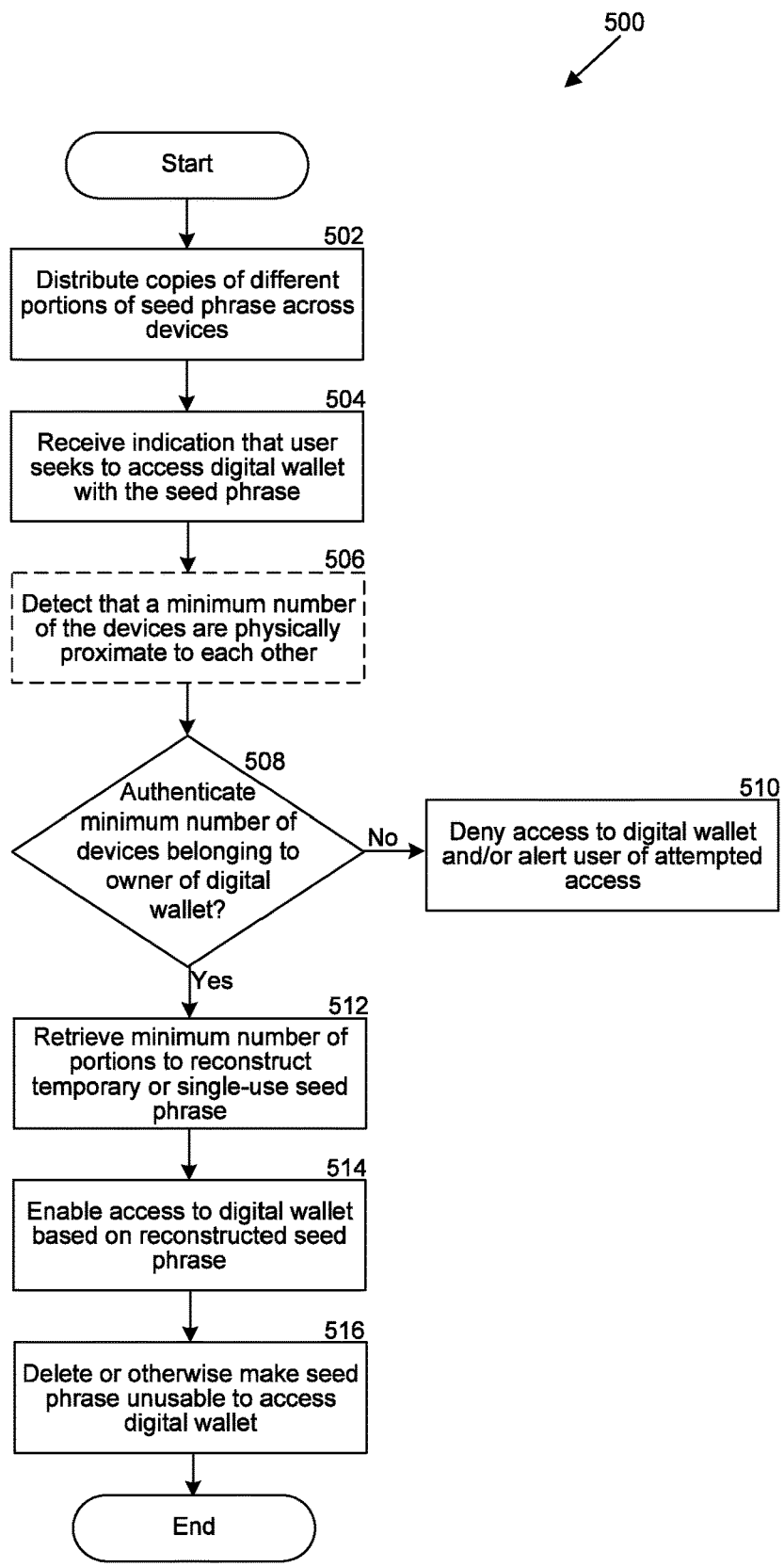
FIG. 5 is a flowchart that illustrates processes for distributing portions of a seed phrase across electronic devices and then reconstructing the seed phrase to access a digital wallet.

FIG. 5 is a flowchart that illustrates processes for distributing portions of a seed phrase across devices and then reconstructing the seed phrase to access a digital wallet. In one example, the seed phrase corresponds to an ordered set of terms (e.g., words). The processes 500 can be performed by a system including a server and/or multiple devices including handheld mobile device, smart device, tablet computer, laptop, desktop, or any other computing device capable of storing and communicating data. In one example, a computer-readable storage medium, excluding transitory signals and carrying instructions, which, when executed by at least one data processor of the system can cause performance of the processes 500.

At 502, copies of N portions of a seed phrase can be distributed across N devices. That is, the devices store the portions of a seed phrase. The seed phrase corresponds to a set of terms that are necessary and sufficient to access a digital wallet owned by the user. The digital wallet is configured to hold private keys to access digital assets stored on a blockchain. Each of the N portions includes a set of terms that is less than the total terms of the complete seed phrase. The distributed portions can all be different (e.g., not identical) or some can be the same (e.g., identical). For example, devices can store different portions of the seed phrase (different terms and/or different order) or devices can store some portions that are the same (e.g., same terms, same order).

There is a minimum number of portions (M) that are necessary and sufficient to reconstruct the seed phrase. As such, M devices are required to reconstruct the seed phrase from a combination of their M portions of the seed phrase. The subset M of the set of N devices stores portions of the seed phrase, where M is greater than one but fewer than all N devices. In one optional example, a security level can be set for the seed phrase. The security level is proportional to a number of terms in a portion such that a higher security level corresponds to fewer terms compared to a lower security level. The system can determine the number of terms for the multiple portions based on the security level. In one example, the distributed portions of the seed phrase each have an equal number of terms, which is less than the total number of terms of the seed phrase. The security of the seed phrase increases as the number of devices storing the portions increases and/or the portions have fewer terms. That is, more portions of the seed phrase would be required to reconstruct the seed phrase if the portions have fewer terms.

At 504, an indication is received that a particular device of the multiple devices storing a particular portion of the multiple portions of the seed phrase seeks to access the digital wallet by reconstructing the seed phrase from a particular subset of the portions of the seed phrase stored at the multiple devices including the particular portion stored at the particular device (the requesting device). In one example, the indication includes an output of the requesting device indicating that the user has initiated access to the digital wallet from the requesting device. In another example, the indication can include that the requesting device and another device of the subset of multiple devices are within a threshold distance of each other for at least a threshold time.

At 506 (optional), the system or a particular a device of the system can detect that another device is within a threshold physical distance. The threshold distance can correspond to a range of a short-range communication necessary to establish a link between the requesting device and the other device, where each store portions of the seed phrase required to reconstruct the seed phrase. The requesting device can thus receive the portions of the seed phrase over the communications links.

At 508, the system determines whether the minimum number of devices are authenticated to share seed phrase information. For example, the device seeking access to the digital wallet can check whether another device that stores another portion of the seed phrase belongs to the same user, which owns the digital wallet. As such, the devices are verified based on a preexisting association (e.g., registration) between the subset of devices.

At 510, the system determines that the minimum number of electronic devices is not available and/or the minimum number of devices are not authenticated to share their portions of the seed phrase with the requesting device. As a result, the user seeking access to the digital wallet is denied. In one example, the system can alert the owner of the digital wallet that an unauthorized access to the digital wallet was attempted. The alert can be communicated via email, SMS text messages, or any other form of messaging.

In one example, the system can authenticate the subset of the electronic devices based on one or more images captured by the particular device as presented on displays of remaining devices of the subset of multiple devices. For example, one device can display a QR code on its display and a requesting device can capture an image of the QR code. The QR code can thus be used to authenticate that the device presenting the QR code belongs to the same user of the device capturing the QR code.

At 512, in response to authenticating the minimum number of devices, the system reconstructs the seed phrase at the requesting device from the subset of the portions of the seed phrases stored at the minimum number of devices. For example, the portions of the seed phrase are assembled as the ordered set of multiple terms of the seed phrase only at the requesting device. In one example, the reconstructed seed phrase is temporary and expires after a time period. That is, the reconstructed seed phrase is based on M portions of the seed phrase retrieved from M electronic devices, where M is less than N, and is temporarily available to access the digital wallet.

At 514, the system enables access to the digital wallet from the requesting device based on the reconstructed seed phrase. As such, the requesting device is enabled to control private keys stored at the digital wallet to access the digital assets, send or receive digital assets associated with the digital wallet, and/or manage the digital assets stored on the blockchain.

At 516, the system can delete, disable, or otherwise cause the reconstructed seed phrase to be unusable at the requesting device after expiration of a time period, for example. In one example, the reconstructed seed phrase is configured for one-time use to access the crypto wallet. As such, the seed phrase becomes unusable after a single use to access the digital wallet.

Computer System

Figure 6:
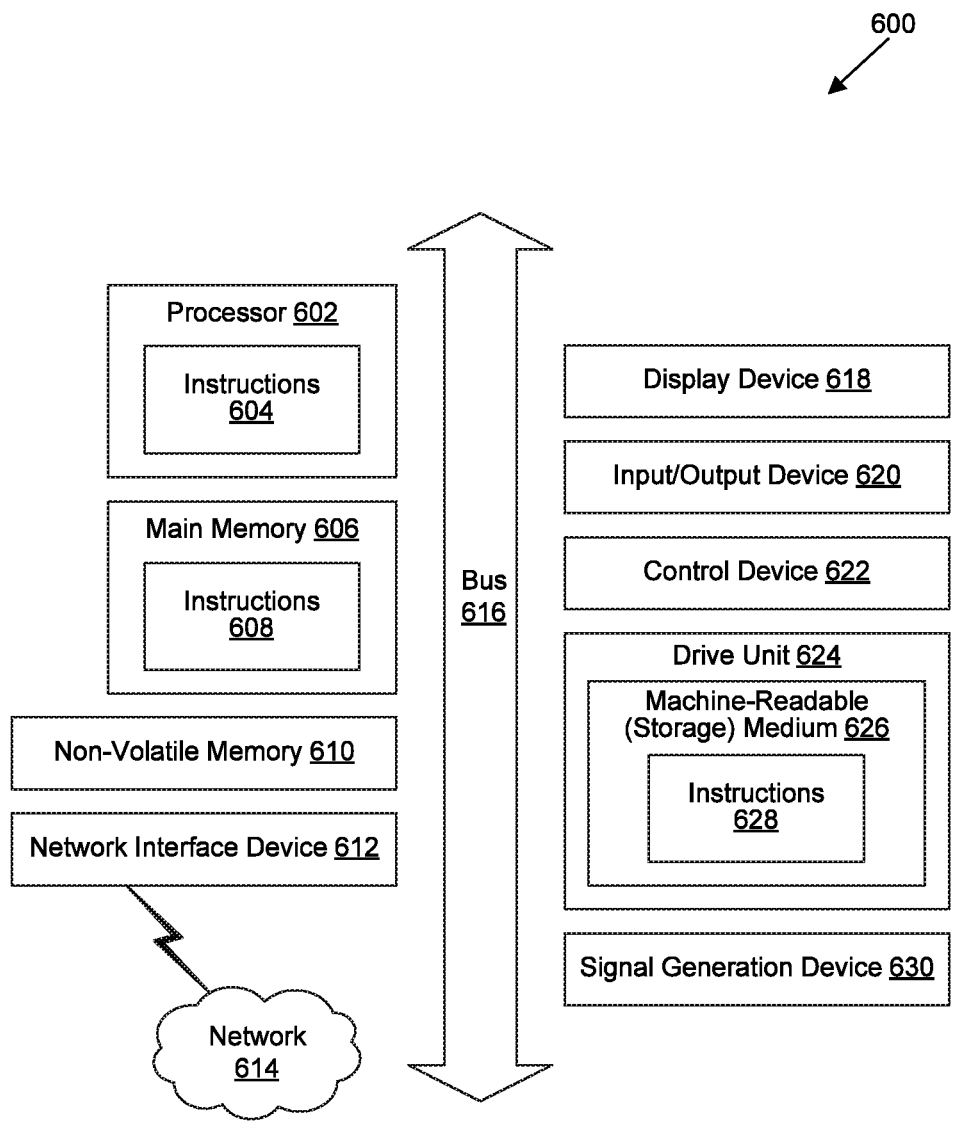
FIG. 6 is a block diagram that illustrates an example of a computer system in which at least some operations described herein can be implemented.

FIG. 6 is a block diagram that illustrates an example of a computer system 600 in which at least some operations described herein can be implemented. As shown, the computer system 600 can include: one or more processors 602, main memory 606, non-volatile memory 610, a network interface device 612, video display device 618, an input/output device 620, a control device 622 (e.g., keyboard and pointing device), a drive unit 624 that includes a storage medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computing system 600 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 600. In some implementation, the computer system 600 can be an embedded computer system, a system-on-chip (SOC), a single-board computer system (SBC) or a distributed system such as a mesh of computer systems or include one or more cloud components in one or more networks. Where appropriate, one or more computer systems 600 can perform operations in real-time, near real-time, or in batch mode.

The network interface device 612 enables the computing system 600 to mediate data in a network 614 with an entity that is external to the computing system 600 through any communication protocol supported by the computing system 600 and the external entity. Examples of the network interface device 612 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computing system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computing system 600 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

The invention claimed is:

1. A computer-readable storage medium, excluding transitory signals and carrying instructions, which, when executed by at least one data processor of a system, cause the system to:
cause multiple devices to store multiple portions of a seed phrase configured to access a digital wallet owned by a user,
wherein the seed phrase corresponds to an ordered set of multiple terms, and
wherein a subset of the multiple devices corresponding to more than one but fewer than all the multiple devices is required to reconstruct the seed phrase from a subset of the multiple portions stored at the subset of the multiple devices;
receive an indication that a particular device of the multiple devices storing a particular portion of the multiple portions of the seed phrase seeks to access the digital wallet by reconstructing the seed phrase from a particular subset of the multiple portions of the seed phrase stored at the multiple devices including the particular portion stored at the particular device;
authenticate the subset of the multiple devices based on a preexisting association between the subset of the multiple devices and the user;
reconstruct the seed phrase at the particular device from the particular subset of the multiple portions of the seed phrase; and
enable access to the digital wallet from the particular device based on the reconstructed seed phrase.

2. The computer-readable storage medium of claim 1, wherein the system is further caused to:
remove or disable the reconstructed seed phrase from the particular device after expiration of a time period.

3. The computer-readable storage medium of claim 1, wherein to authenticate the subset of the multiple devices comprises causing the system to:
authenticate the subset of the multiple devices based on one or more images captured by the particular device as presented on displays of the subset of multiple devices.

4. The computer-readable storage medium of claim 1, wherein the multiple devices include a smartphone, a smart watch, and a tablet computer.

5. The computer-readable storage medium of claim 1, wherein the multiple portions have an equal number of terms, and wherein the system is caused to, prior to causing the multiple devices to store the multiple portions of the seed phrase:
set a security level for the seed phrase,
wherein the security level is proportional to a number of terms in each portion such that a higher security level corresponds to fewer terms compared to a lower security level; and
determine the number of terms for the multiple portions based on the security level.

6. The computer-readable storage medium of claim 1, wherein all the multiple portions of the seed phrase stored at the multiple devices are non-identical.

7. The computer-readable storage medium of claim 1, wherein some of the multiple portions of the seed phrase stored at the multiple devices are identical.

8. The computer-readable storage medium of claim 1, wherein the indication includes an output of the particular device indicating that the user has initiated access to the digital wallet from the particular device.

9. The computer-readable storage medium of claim 1, wherein the indication includes that the particular device and another device of the subset of multiple devices are within a threshold distance of each other for at least a threshold time.

10. The computer-readable storage medium of claim 1, wherein to reconstruct the seed phrase comprises causing the system to:
configure the reconstruct seed phrase for one-time use to access the digital wallet.

11. The computer-readable storage medium of claim 1, wherein to reconstruct the seed phrase comprises causing the system to:
assemble the multiple portions as the ordered set of multiple terms of the seed phrase only at the particular device.

12. The computer-readable storage medium of claim 1, wherein to enable access to the digital wallet from the particular device based on the reconstruct seed phrase comprises causing the system to:
enable the user to manage digital assets stored on a blockchain, control private keys stored at the digital wallet to access the digital assets, or send or receive digital assets associated with the digital wallet.

13. A first electronic device comprising:
at least one hardware processor; and
at least one non-transitory memory storing a first portion of a seed phrase configured to access a crypto wallet of a user,
wherein the seed phrase corresponds to an ordered set of multiple terms,
wherein a second electronic device separate from the first electronic device stores a second portion of the seed phrase different from the first portion of the seed phrase, and
wherein the at least one non-transitory memory stores instructions, which, when executed by the at least one hardware processor, cause the first electronic device to:
receive an indication that the user seeks to access the crypto wallet based on the seed phrase;
detect that the second electronic device is physically proximate to the first electronic device;
in response to detecting that the second electronic device is physically proximate to the first electronic device, cause the second electronic device to communicate the second portion of the seed phrase to the first electronic device;
temporarily assemble the seed phrase based on the first portion and the second portion; and
enable one-time access to the crypto wallet from the first electronic device based on the assembled seed phrase.

14. The first electronic device of claim 13 further caused to, prior to causing the second electronic device to communicate the second portion of the seed phrase to the first electronic device:

determine that the second electronic device is registered for the user.

15. The first electronic device of claim 13:
wherein a third electronic device stores a third portion of the seed phrase,
wherein the first, second, and third portions of the seed phrase are not identical to each other, and
wherein any two of the first, second, and third portions are necessary and sufficient to assemble the seed phrase.

16. A method for securing a seed phrase, the method comprising:
causing N portions of the seed phrase to be copied onto N electronic devices,
wherein the seed phrase corresponds to an ordered set of K terms that are necessary and sufficient to access a digital wallet configured to hold private keys to access digital assets stored on a blockchain,
wherein each of the N portions includes a set of J terms, and
wherein J is a number less than K;
temporarily assembling the seed phrase at a particular electronic device of the N electronic devices based on M portions of the seed phrase retrieved from M electronic devices,
wherein M is a number less than N but necessary and sufficient to assemble the seed phrase; and
enabling access to the digital wallet based on the assembled seed phrase,
wherein the assembled seed phrase is deleted or removed from the particular electronic device after expiration of a time period or after only one use to access the digital wallet.

17. The method of claim 16, wherein the particular electronic device is a first electronic device, the method further comprising, prior to temporarily assembling the seed phrase:
causing a second electronic device to communicate a second portion of the seed phrase to the first electronic device; and
determine that the second electronic device is registered to a user of the first electronic device.

18. The method of claim 16, further comprising, prior to temporarily assembling the seed phrase:
detecting that the M electronic devices are within a threshold physical distance from each other;
establishing one or more short-range radio communication links between the particular device and the M electronic devices; and
causing the particular electronic device to receive the M portions of the seed phrase over the one or more short range radio communication links.

19. The method of claim 16, wherein a security level of seed phrase increases as N increases and K decreases.

* * * * *